(12) United States Patent
Ishida

(10) Patent No.: US 8,124,926 B2
(45) Date of Patent: Feb. 28, 2012

(54) KEY DEVICE AND ELECTRONIC DEVICE COMPRISING THE SAME

(75) Inventor: Yuuji Ishida, Yokohama (JP)

(73) Assignee: Kyocera Corporation, Kyoto (JP)

( * ) Notice: Subject to any disclaimer, the term of this patent is extended or adjusted under 35 U.S.C. 154(b) by 371 days.

(21) Appl. No.: 12/408,347

(22) Filed: Mar. 20, 2009

(65) Prior Publication Data

US 2009/0236499 A1    Sep. 24, 2009

(30) Foreign Application Priority Data

Mar. 24, 2008   (JP) ................................ 2008-075869

(51) Int. Cl.
  *G02B 6/00*   (2006.01)
(52) U.S. Cl. .......... 250/227.14; 250/227.21; 250/227.22
(58) Field of Classification Search ............. 250/227.14, 250/227.21, 227.22
  See application file for complete search history.

(56) References Cited

U.S. PATENT DOCUMENTS

| | | | | |
|---|---|---|---|---|
| 3,796,880 | A | * | 3/1974 | Dorey ........................ 250/227.22 |
| 3,856,127 | A | * | 12/1974 | Halfon et al. .................. 400/479 |
| 4,641,026 | A | * | 2/1987 | Garcia, Jr. ...................... 250/229 |
| 5,677,688 | A | * | 10/1997 | O'Mara et al. .................. 341/31 |
| 2004/0136637 | A1 | | 7/2004 | Verweg | |

FOREIGN PATENT DOCUMENTS

| | | |
|---|---|---|
| JP | 60160417 U | 10/1985 |
| JP | 62112819 U | 7/1987 |
| JP | 05033235 U | 4/1993 |
| JP | 2003-186607 | 7/2003 |
| JP | 2004520661 A | 7/2004 |
| JP | 2007266895 A | 10/2007 |
| WO | 02095944 A1 | 11/2002 |

OTHER PUBLICATIONS

Japanese language office action dated May 18, 2010 and its English language translation for corresponding Japanese application 2008075869 lists the references above.

* cited by examiner

*Primary Examiner* — Tony Ko
(74) *Attorney, Agent, or Firm* — DLA Piper LLP (US)

(57) ABSTRACT

The key device of the present invention is provided with: first light-emitting portions that emit light propagating in a first direction; second light-emitting portions that emit the light R propagating in a second direction; converters H that can convert a propagating direction of light from the first direction to the second direction, or from the second direction to the first direction; first light-receiving portions that receive light propagating in the first direction through the converters; second light-receiving portions that receive light propagating in the second direction through the converters; and a plurality of keys, which are provided correspondingly to the converters, and which determine whether the propagating direction of light is converted in the converters.

12 Claims, 11 Drawing Sheets

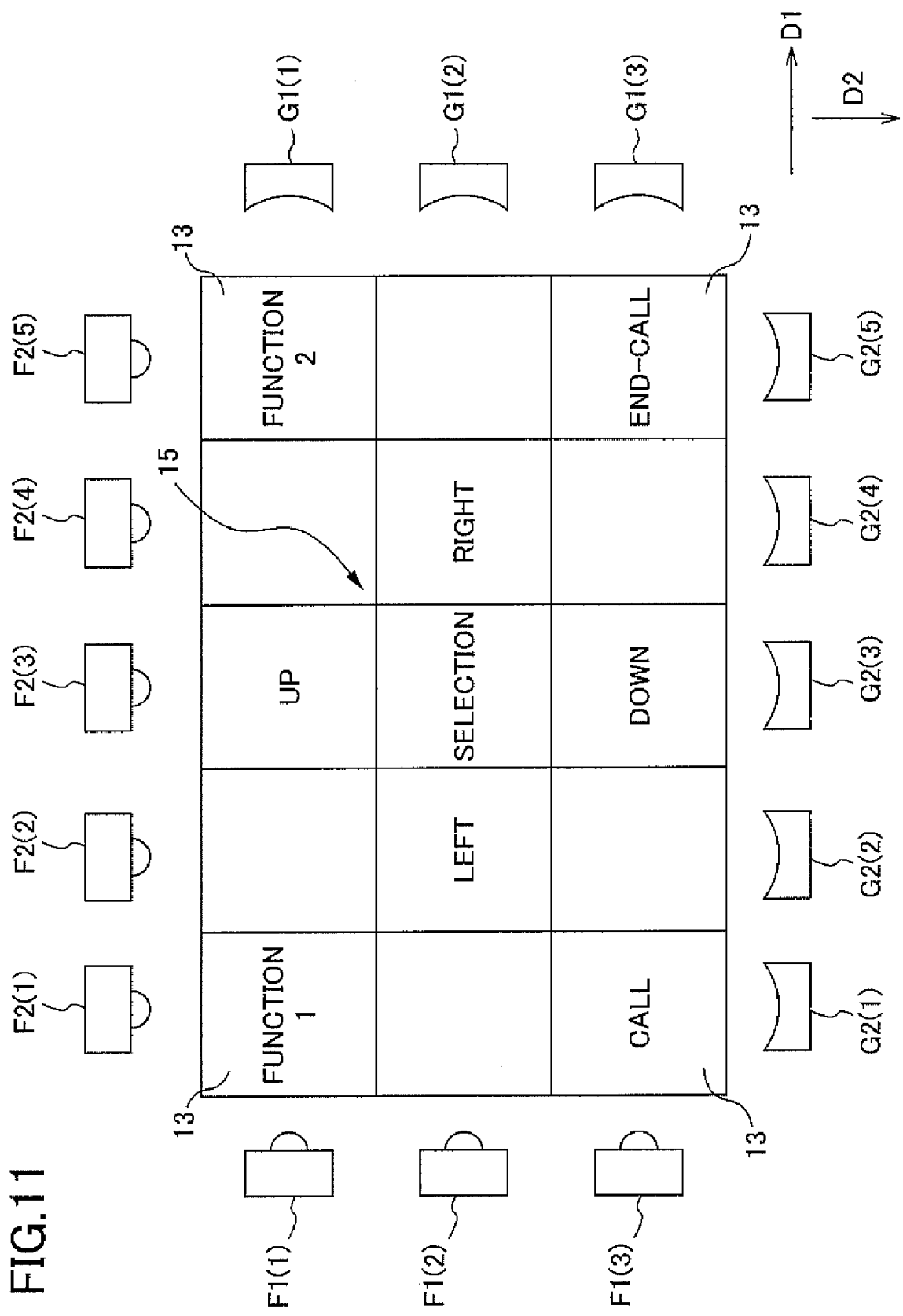

KEY DEVICE AND ELECTRONIC DEVICE COMPRISING THE SAME

This application is based on and claims the benefit of priority from Japanese Patent Application No. 2008-075869, filed on 24 Mar. 2008, the content of which is incorporated herein by reference.

BACKGROUND OF THE INVENTION

1. Field of the Invention

The present invention relates to a key device, which is provided to a device such as an electronic device provided with an input means that uses depression of keys, and which detects presence or absence of the depression of the keys, as well as to an electronic device provided with the key device.

2. Related Art

An electronic device such as a cellular telephone device is provided with an input means that uses the depression of keys such as numeric keys. In a conventional input means, the presence or absence of key depression has been detected using an electric circuit formed in matrix state (in lines) (a device for detecting presence or absence of key depression is hereinafter referred to as a "key device"). In other words, in the conventional key device, a particular portion in the electric circuit formed in the matrix state is scanned, and a difference of detecting voltage due to the depression of keys is detected, thereby identifying a depressed key (see, for example, Japanese Unexamined Patent Application, First Publication No. 2003-186607).

However, in the aforementioned input means, switching noise is generated from the electric circuit formed in the matrix state. Accordingly, in the key device, in order to avoid interference by the switching noise, it is necessary to take countermeasures such as appropriately setting a positional relationship between a member, which constitutes an antenna, and an electric conductor such as an electric circuit, and providing a shielding member. In other words, since the design freedom is low in the conventional key device, a key device that makes it possible to enhance the design freedom, as well as an electronic device provided with such a key device have been desired.

Therefore, with regards to a key device, which is provided to a device such as an electronic device including an input means that utilizes key depression, and which detects presence or absence of the key depression, an object of the present invention is to provide a key device that makes it possible to raise the degree of design freedom in the device, and an electronic device including such a key device.

SUMMARY OF THE INVENTION

The key device of the present invention is characterized in that it is provided with: m number of first light-emitting portions that emit light propagating in a first direction (m is an integer of at least 1); n number of second light-emitting portions that emit light propagating in a second direction other than the first direction (n is an integer of at least 2); a plurality of converters, which are respectively provided at intersections of the light propagating in the first direction and the light propagating in the second direction in a case in which the m number of the first light-emitting portions and the n number of the second light-emitting portions emit the light at the same time, and which can convert the propagating direction of the light from the first direction to the second direction or from the second direction to the first direction; at least m number of first light-receiving portions that receive the light propagating in the first direction through the converters; at least n number of second light-receiving portions that receive the light propagating in the second direction through the converters; and a plurality of keys, which are provided correspondingly to the plurality of converters, respectively, and which determine whether the propagating direction of the light in the converters is converted.

BRIEF DESCRIPTION OF THE DRAWINGS

FIG. 7A is a cross-sectional view of the input operation key 14 in a non-depressed state, which is sectioned along a first direction D1 (cross section along A-A in FIG. 6);

FIG. 7B is a cross-sectional view of the input operation key 14 in a depressed state, which is sectioned along the first direction D1 (cross section along B-B in FIG. 6);

FIG. 8A is a cross-sectional view of the input operation key 14 in the non-depressed state, which is sectioned along a second direction D2 (cross section along C-C in FIG. 6);

FIG. 8B is a cross-sectional view of the input operation key 14 in the depressed state, which is sectioned along the second direction D2 (cross section along D-D in FIG. 6);

FIG. 9A is a view showing the reflector 52;

FIG. 9B is a view showing a first transmission portion 53;

FIG. 9C is a view showing a second transmission portion 54;

FIG. 11 is a schematic diagram showing function setting operation keys 13 and a selection operation key 15, as well as the light-emitting portions F1 and F2 and the light-receiving portions G1 and G2, which are related to detection of depression of these keys 13 and 15 (the diagram corresponding to FIG. 5).

DETAILED DESCRIPTION OF THE INVENTION

An example of a best mode for carrying out the present invention is hereinafter described with reference to the accompanying drawings. First, a basic structure of a cellular telephone device 1, which is a first embodiment of an electronic device and a communications device of the present invention, is described with reference to FIGS. 1 to 4. The cellular telephone device 1 of the first embodiment includes one embodiment of a key device of the present invention.

Figure 1:
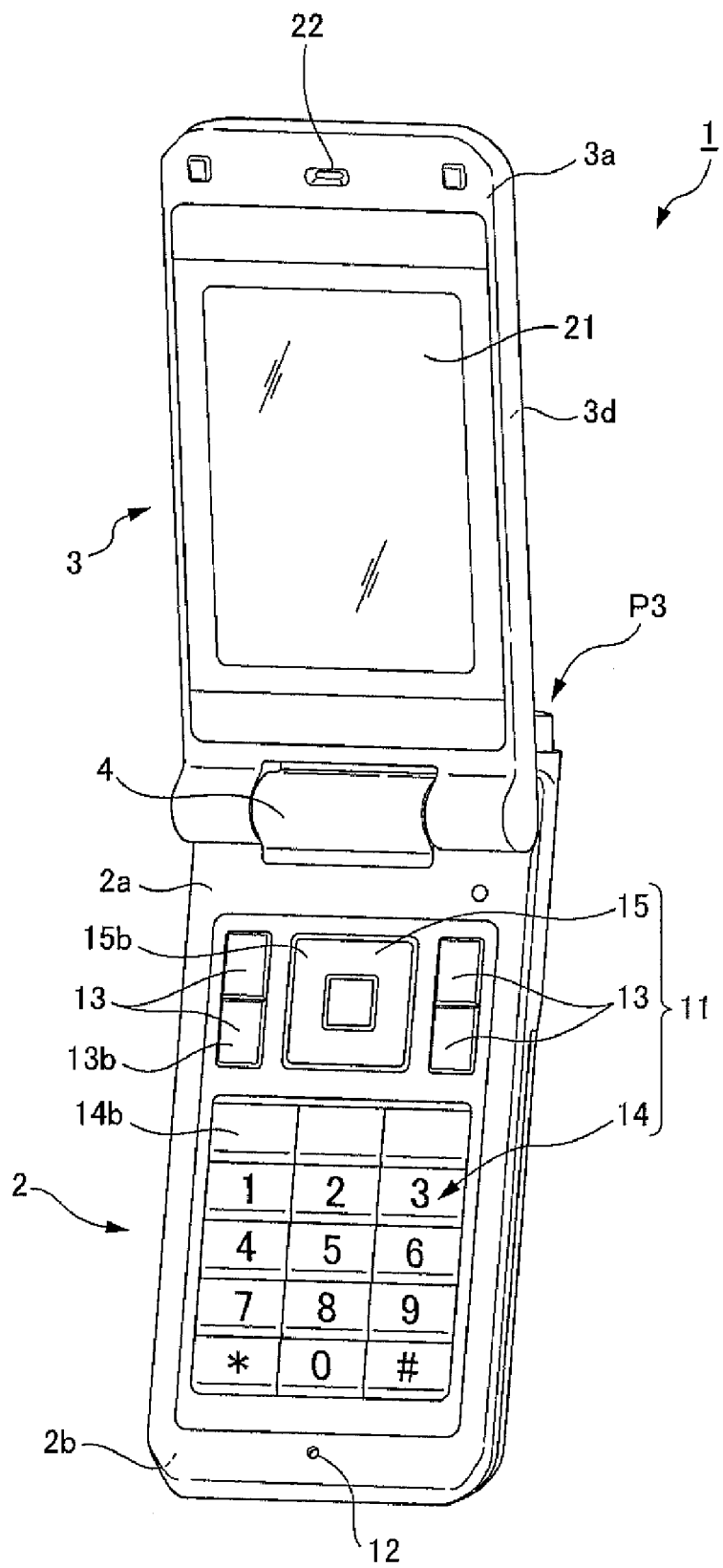
FIG. 1 is an outside perspective view showing a cellular telephone device 1 of a first embodiment in an opened state.
Figure 2:
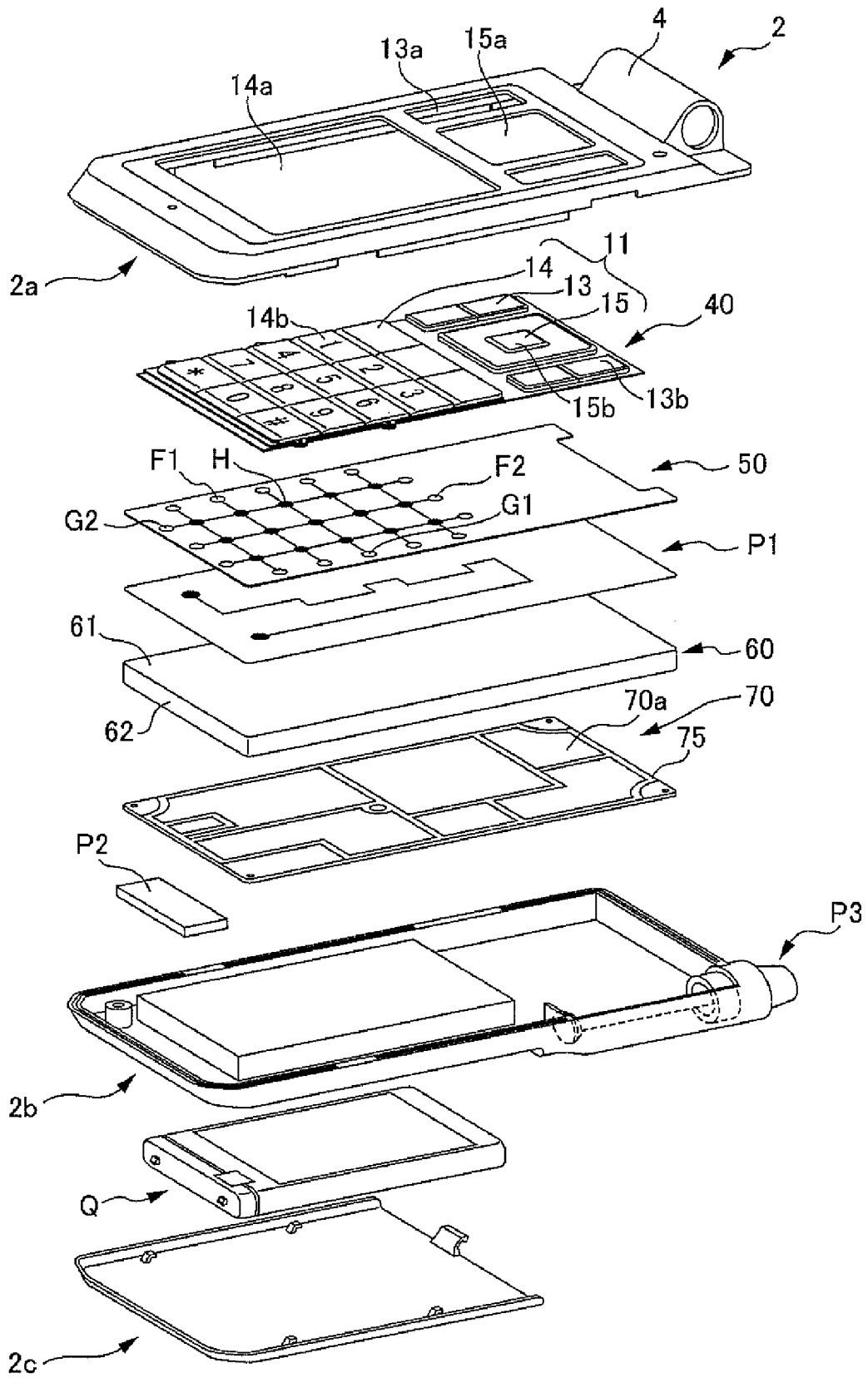
FIG. 2 is an exploded perspective view of members that are built into an operation unit side body 2 shown in FIG. 1.
Figure 3:
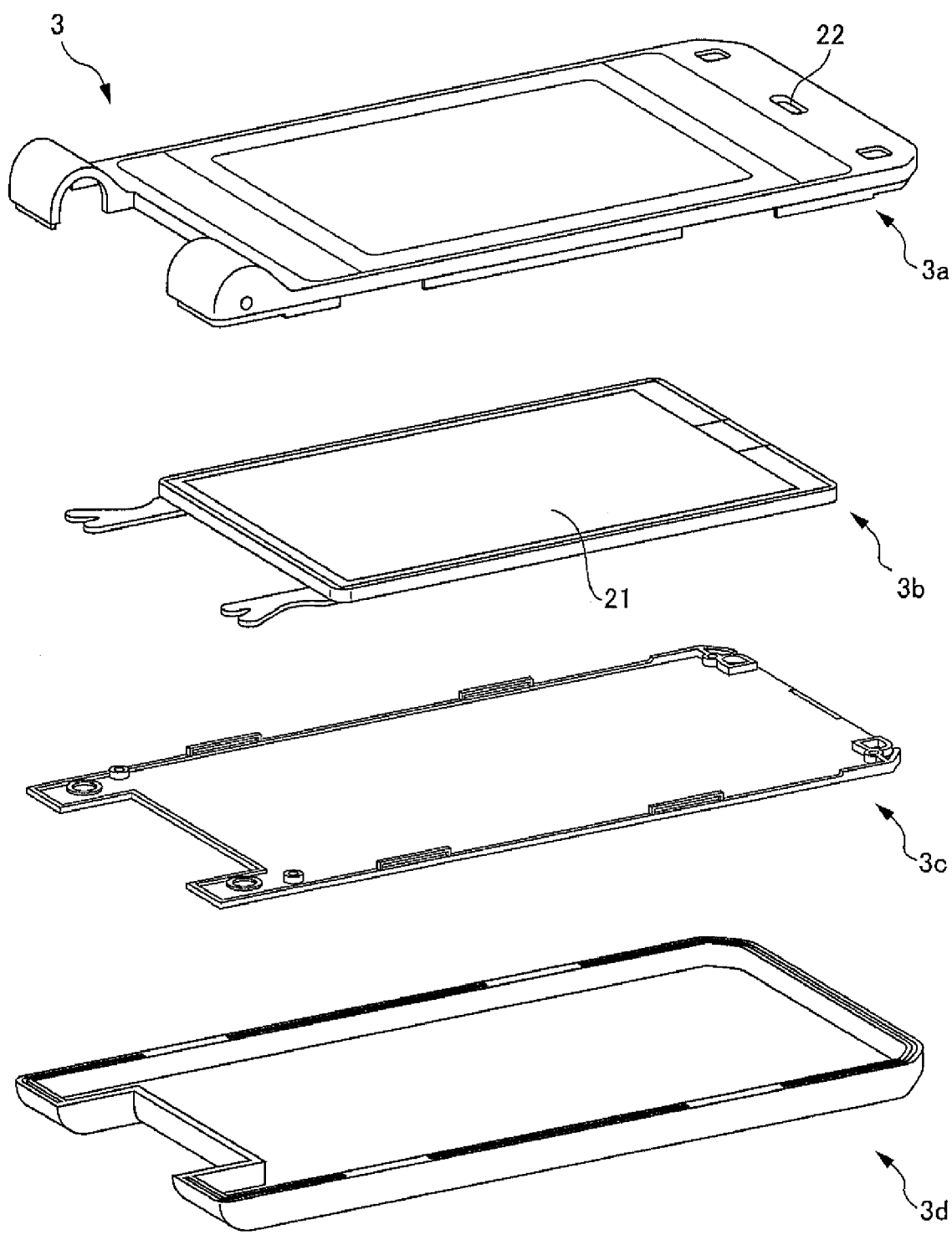
FIG. 3 is an exploded perspective view of members that are built into a display unit side body 3 shown in FIG. 1.
Figure 4:
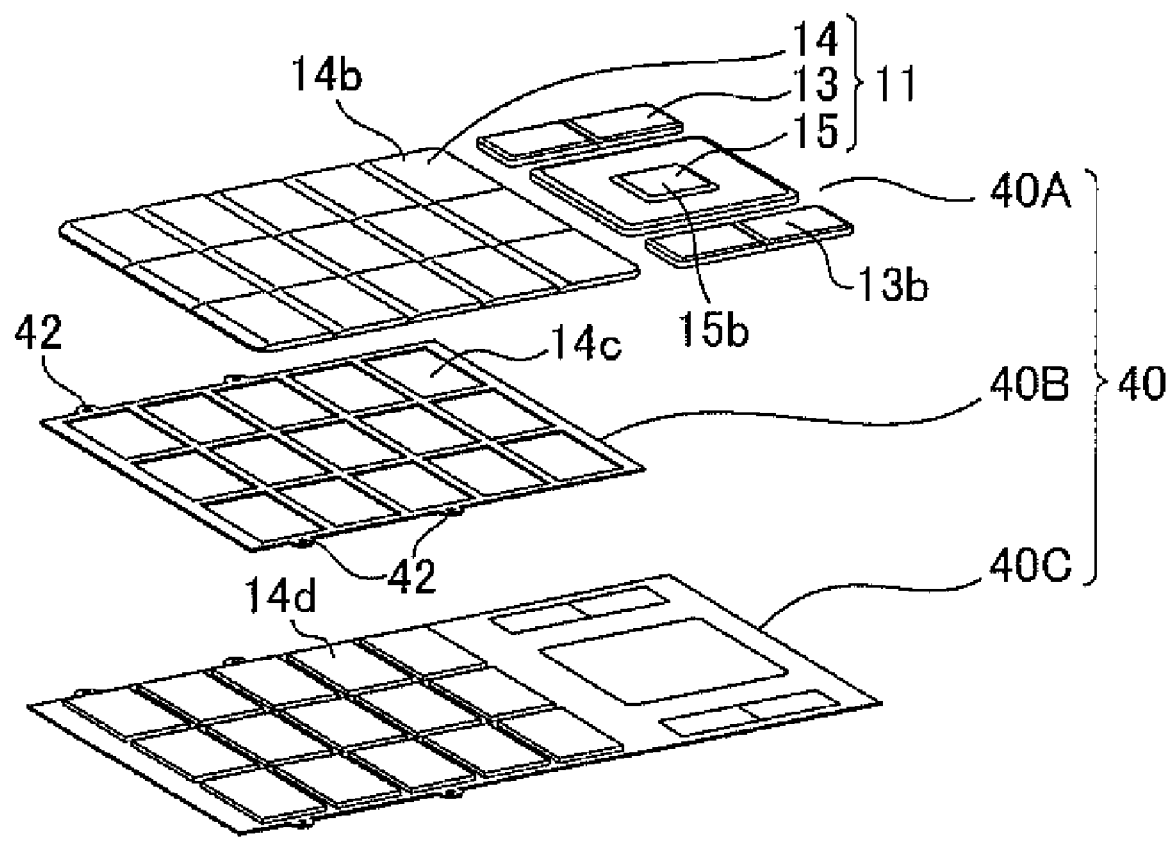
FIG. 4 is an exploded perspective view of a key structure unit 40 shown in FIG. 2.

FIG. 1 is an outside perspective view showing the cellular telephone device 1 of the first embodiment in an opened state. FIG. 2 is an exploded perspective view of members that are built into an operation unit side body 2 shown in FIG. 1. FIG. 3 is an exploded perspective view of members that are built into a display unit side body 3 shown in FIG. 1. FIG. 4 is an exploded perspective view of a key structure unit 40 shown in FIG. 2.

As shown for illustration in FIG. 1, the cellular telephone device 1 of the first embodiment is provided with the operation unit side body 2 and the display unit side body 3. The operation unit side body 2 and the display unit side body 3 are connected via a connecting portion 4 provided with a hinge mechanism so as to be openable and closable around an opening-and-closing axis (not shown). More specifically, an upper end portion of the operation unit side body 2 and a lower end portion of the display unit side body 3 are connected via the connecting portion 4. As a result, the cellular telephone device 1 is configured so as to make it possible to relatively move the operation unit side body 2 and the display unit side body 3 connected via the connecting portion 4.

In other words, the cellular telephone device 1 can be either in a state (an opened state) in which the operation unit side body 2 and the display unit side body 3 are opened, or in a state (a closed state) in which the operation unit side body 2 and the display unit side body 3 are folded. Here, the closed state is a state in which the bodies 2 and 3 are disposed so as to be mutually superimposed. The opened state is a state in which the bodies 2 and 3 are disposed so as not to be mutually superimposed.

As shown for illustration in FIGS. 1 and 2, an outer surface of the operation unit side body 2 is configured with a front case 2a and a rear case 2b. The operation unit side body 2 is configured such that an operation key group 11 and a sound input unit 12 are exposed on the side of the front case 2a, in which the sound input unit 12 serves as a microphone to which the sound of the user of the cellular telephone device 1 is input when conversing.

The operation key group 11 is configured with function setting operation keys 13 for operating various settings and various functions such as an address book function and a mail function; input operation keys 14 for inputting telephone numbers and characters and the like for mail and the like; and a selection operation key 15 as an operation member for performing selections in various operations and scrolling in up-down and left-right directions.

As shown for illustration in FIG. 1, the input operation keys 14 consist of fifteen keys in total disposed in a matrix state (in lines) of five lines and three columns. The fifteen input operation keys 14 include numeric keys 0 to 9, "*", "#" and the like.

A predetermined function is assigned to each of the keys constituting the operation key group 11 (key assignment), depending on an opened or closed state of the operation unit side body 2 and the display unit side body 3 as well as various modes, or types of an application or the like that is activated. When the user depresses each key, an operation corresponding to a function assigned to each key is executed.

The sound input unit 12 is disposed on an outer end portion side that is opposite to the connecting portion 4 side in the longitudinal direction of the operation unit side body 2. In other words, the sound input unit 12 is disposed in one outer end portion side in the opened state of the cellular telephone device 1.

An interface (not shown) for performing communication with external devices (e.g., a host device) is disposed on a lateral face of one side of the operation unit side body 2. A side key, to which a predetermined function is assigned, and an interface (not shown) with which external memory is inserted and removed are disposed on a lateral face of another side of the operation unit side body 2. Each interface is covered with a cap when not in use.

As shown for illustration in FIGS. 1 and 3, the display unit side body 3 is provided with a front case 3a, a front panel 3b, a rear panel 3c, and a rear case 3d. A display unit 21 for displaying various information and a sound output unit 22 for outputting sound of the other party of the conversation are disposed so as to be exposed in the front case 3a in the display unit side body 3. Here, the display unit 21 is configured with a liquid crystal panel; a drive circuit for driving the liquid crystal panel; and a light source unit such as a back light for irradiating light from the back side of the liquid crystal panel.

The cellular telephone device 1 has a plurality of functions. The cellular telephone device 1 has, for example, a terrestrial digital broadcast reception control function, an AM radio broadcast reception control function, an FM radio broadcast reception control function, a main power supply control function (on/off control function), and the like.

Next, an internal structure of the operation unit side body 2 and the display unit side body 3 is described with reference to FIGS. 2 to 4.

First, the internal structure of the operation unit side body 2 is described.

As shown for illustration in FIG. 2, the operation unit side body 2 is provided with the front case 2a, the key structure unit 40, an optical switch substrate 50, an antenna sheet P1, a shielding case 60, a circuit board 70, the rear case 2b provided with a battery lid 2c, and a battery Q. The circuit board 70 is provided with a reference potential patterned layer 75 and various electronic parts such as an RF (Radio Frequency) module for cellular telephone device.

A key device K in the first embodiment is configured mainly with the key structure unit 40 and the optical switch substrate 50. Details of the key device K are described later.

The front case 2a and the rear case 2b are disposed such that concave inner faces thereof face each other, and are connected such that peripheries thereof are mutually superimposed. Moreover, the key structure unit 40, the optical switch substrate 50, the antenna sheet P1, the shielding case 60, and the circuit board 70 are assembled internally so as to be interposed between the front case 2a and the rear case 2b.

Key holes 13a, 14a and 15a are formed as openings in the front case 2a on the inner surface facing the display unit 21 of the display unit side body 3 in a state in which the cellular telephone device 1 is folded. Push surfaces of function setting operation key members 13b constituting the function setting operation keys 13, push surfaces of input operation key members 14b constituting the input operation keys 14, and a push surface of a selection operation key member 15b constituting the selection operation key 15 are exposed from the key holes 13a, 14a and 15a, respectively. By depressing the push surfaces of the function setting operation key members 13b, the push surfaces of the input operation key members 14b, and the push surface of the selection operation key member 15b, which are exposed in this way, a corresponding converter H (to be described later) is depressed.

As shown for illustration in FIG. 4, the key structure unit 40 is configured with an operation member 40A, a key frame 40B, and a key sheet 40C.

The operation member 40A is configured with a plurality of key operation members. More specifically, the operation member 40A is configured with function setting operation key members 13b, input operation key members 14b, and a selection operation key member 15b. Each operation key member constituting the operation member 40A is adhered to the key sheet 40C with the key frame 40B interposed therebetween. As described above, the push surfaces of the operation key members adhered to the key sheet 40C are disposed so as to be exposed to the outside from the key holes 13a, 14a and 15a, respectively.

The key frame 40B is a metallic plate-like member in which a plurality of holes 14c are formed. The key frame 40B is a reinforcing structure for preventing an adverse effect on the circuit board 70 and the like due to depression of the input operation key members 14b. In this case, the key frame 40B can also be used as an antenna.

Convex portions 14d (to be described later) formed on the key sheet 40C are disposed to fit into the plurality of holes 14c formed in the key frame 40B. The input operation key members 14b are adhered to the convex portions 14d.

The key sheet 40C is a sheet-like member made of silicon rubber having flexibility. The plurality of convex portions 14d are formed on the key sheet 40C. The plurality of convex portions 14d are formed on the surface of the key sheet 40C on which side the key frame 40B is disposed. The plurality of convex portions 14d are formed on positions respectively corresponding to converters H to be described later.

The function setting operation keys 13, the input operation keys 14 and the selection operation key 15 are made of optically-transparent members. Accordingly, light released from light-releasing portions 57 of light-guiding portions 56 can be utilized as lighting for the keys as described later.

The optical switch substrate 50 is a substrate that is equipped with a switch utilizing optical actions. The optical switch substrate 50 is provided with, on the side of the key sheet 40C, a plurality of first light-emitting portions F1, a plurality of second light-emitting portions F2, a plurality of converters H, a plurality of first light-receiving portions G1, and a plurality of second light-receiving portions G2. The plurality of converters H are disposed at positions respectively corresponding to the operation members 40A. It should be noted that, in FIG. 2, only the converters H for the input operation keys 14 are illustrated, and illustrations are omitted for the converters H for the function setting operation keys 13 and the selection operation key 15. A detailed configuration of the converter H is described later.

The antenna sheet P1 is a sheet-like antenna, and wiring that constitutes the antenna is formed, for example, by printing on a sheet-like insulating base material to form an antenna. The insulating base material is a member for ensuring a sufficient distance between the shielding case 60 and the wiring that forms an antenna, and for achieving insulation.

Since the antenna sheet P1 has a maximum gain provided in a state in which the operation unit side body 2 and the display unit side body 3 are opened, it can be effectively utilized as, for example, a communications transmitting and receiving antenna, a communication diversity antenna, an FM radio receiving antenna, a TV receiving antenna, a GPS receiving antenna, and the like.

The shielding case 60 is an electrically-conductive member having a shape in which one broad surface of a thin rectangular parallelepiped is opened. The shielding case 60 is provided with a flat plate portion 61 on which the optical switch substrate 50 and the antenna sheet P1 are placed, and ribs 62 that are formed to be substantially perpendicular to the opened surface of the flat plate portion 61. The ribs 62 are formed so as to have a height that is equivalent to, or sufficiently higher than, a height of the highest electronic part among various electronic parts mounted to the circuit board 70. The ribs 62 are formed in the periphery and inside of the flat plate portion 61 so as to correspond to the reference potential patterned layer 75 constituting a reference potential portion. More specifically, the ribs 62 are formed so as to be disposed on the reference potential patterned layer 75 in a state in which the shielding case 60 is placed on the circuit board 70.

It should be noted that the entirety of the shielding case 60 can be configured from metal. Moreover, it is also possible to configure the shielding case 60 by forming a conductive film on a surface of a skeleton formed of resin.

Moreover, since the optical switch substrate 50 is placed on the flat plate portion 61 of the shielding case 60, pressure and deformation due to depression of each of the operation members 40A are not likely to be transmitted to the circuit board 70 disposed under the shielding case 60.

Bottom faces of the ribs 62 abut to the reference potential patterned layer 75, thereby electrically connecting the shielding case 60 to the reference potential patterned layer 75. The shielding case 60 has an electric potential that is as high as the reference potential patterned layer 75 by being electrically connected to the reference potential patterned layer 75.

The shielding case 60 suppresses effects of noise, such as high frequencies from the outside, on various electronic parts disposed on the circuit board 70. Moreover, the shielding case 60 shields noise that is emitted from an RF (Radio Frequency) circuit, a CPU circuit, a power supply circuit and the like, thereby suppressing effects of the noise on the other electronic parts, a receiver circuit connected to the antenna, and the like. More specifically, by positioning the bottom faces of the ribs 62 in the shielding case 60 on the reference potential patterned layer 75, each circuit is surrounded by the ribs 62 and covered by a part of the flat plate portion 61. The ribs 62 function as a barrier plate in each circuit, and shield each circuit in collaboration with a portion of the flat plate portion 61.

Various electronic parts and circuits (not shown) are disposed on the circuit board 70. The various electronic parts form a plurality of circuit blocks by way of a predetermined combination. For example, various circuit blocks including an RF (Radio Frequency) circuit, a power supply circuit and the like are formed.

In addition to the aforementioned various electronic parts, the reference potential patterned layer 75 constituting the reference potential portion is formed on a first surface 70a of the circuit board 70 to the side of the shielding case 60. The reference potential patterned layer 75 is formed so as to divide each of the aforementioned circuit blocks. The reference potential patterned layer 75 is formed by printing conductive members in a predetermined pattern on the first surface 70a of the circuit board 70.

A main antenna P2 is configured by disposing an antenna element of a predetermined shape on the base. The main antenna P2 is disposed to an end portion side that is opposite to the connecting portion 4 in the cellular telephone device 1. The antenna element of the main antenna P2 is formed of a belt-shaped sheet metal. Moreover, electrical power is fed to the main antenna P2 from the circuit board 70 via a feed terminal (not shown) As a result, electrical power is fed to the antenna element from the circuit board 70 via the feed terminal, and the antenna element is connected to the RF module and the like of the circuit board 70.

A TV receiving antenna P3 receives radio waves of so-called one-segment broadcasting as terrestrial digital broadcasting. The TV receiving antenna P3 is extractably provided to the operation unit side body 2.

A removable battery lid 2c is provided to one end portion side of the rear case 2b. The battery lid 2c is mounted to the rear case 2b after accommodating the battery Q from the outside of the rear case 2b. Moreover, a microphone (not shown) of the sound input unit 12 for inputting sound of the user is accommodated in one end portion side of the rear case 2b.

Next, an internal structure of the display unit side body 3 is described.

As shown for illustration in FIG. 3, the display unit side body 3 is provided with the front case 3a, the sound output unit 22, the front panel 3b, the display unit 21, a printed board (not shown) connected to the display unit 21, the rear panel 3c, and the rear case 3d.

In the display unit side body 3, the front case 3a, the front panel 3b, the display unit 21, the printed board, the rear panel 3c and the rear case 3d are disposed to be layered. More specifically, the front case 3a and the rear case 3b are disposed such that concave inner faces thereof face each other, and are connected such that peripheries thereof are mutually superimposed. The printed board connected to the display unit 21 is internally assembled so as to be interposed between the front case 3a and the rear case 3d. A speaker connected to an amplifier, both of which are not shown, is connected to the printed board.

Next, the key device K in the first embodiment is described with reference to FIGS. 5 to 9c. The key device K is configured mainly with the key structure unit 40 and the optical switch substrate 50.

Figure 5:
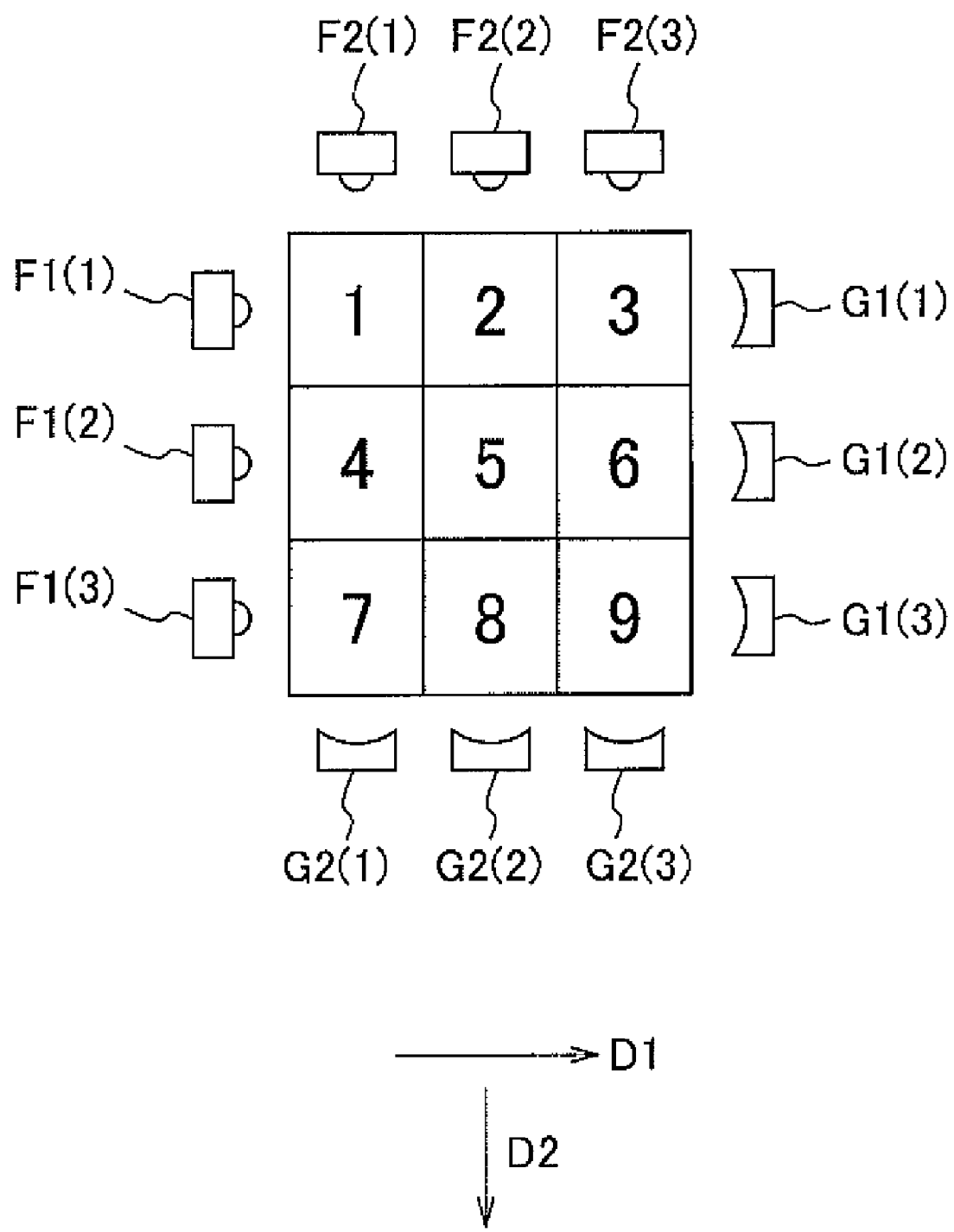
FIG. 5 is a schematic diagram showing numeric keys 1 to 9 of input operation keys 14, as well as a part of light-emitting portions F1 and F2 and light-receiving portions G1 and G2.
Figure 6:
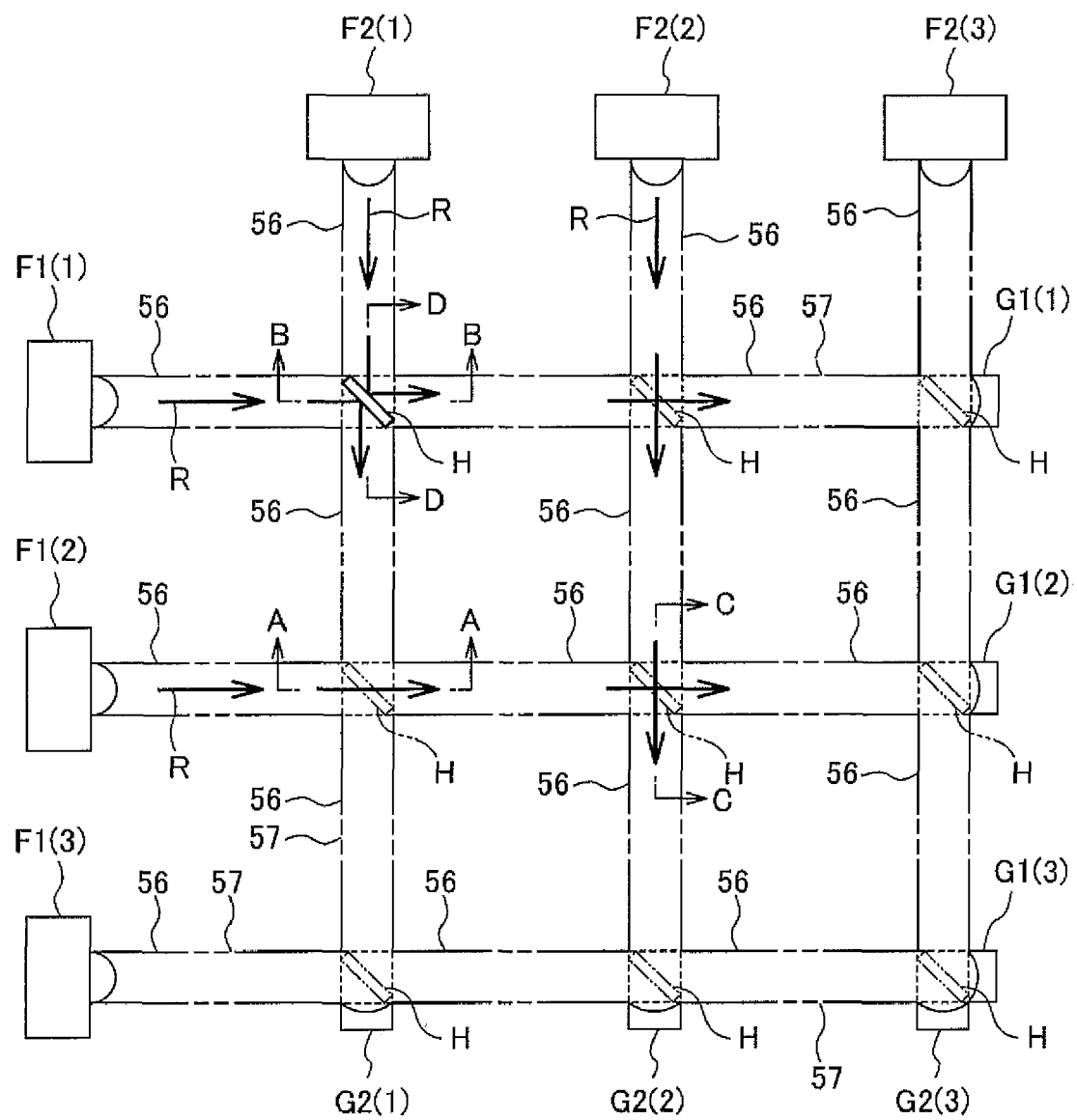
FIG. 6 is a schematic diagram showing propagating directions of light R emitted from the light-emitting portions F1 and F2.

FIG. 5 is a schematic diagram showing numeric keys 1 to 9 of the input operation keys 14, as well as part of the light-emitting portions F1 and F2 and the light-receiving portions G1 and G2. FIG. 6 is a schematic diagram showing propagating directions of light R emitted from the light-emitting portions F1 and F2.

As shown for illustration in FIG. 5 and FIG. 6, the key device K in the first embodiment is a device that detects presence or absence of depression of one or more keys (e.g., the numeric keys 14). According to the key device K in the first embodiment, while the numeric keys 14 or the like are depressed, each of m number of the first light-receiving portions G1 and n number of the second light-receiving portions G2 detects the presence or absence of light reception of the light R propagating through the converters H, and when there is light reception, the first light-emitting portion F1 or the second light-emitting portion F2 which has emitted the light R is identified, thereby making it possible to detect the presence or absence of depression of the keys 14.

It should be noted that, for convenience of explanation, in FIG. 5, the numeric keys 1 to 9 of the input operation keys 14, as well as part of the first light-emitting portions F1 and the second light-emitting portions F2, and part of the first light-receiving portions G1 and the second light-receiving portions G2 are schematically shown. In FIG. 5, illustrations are omitted for keys other than the numeric keys 1 to 9 (e.g., keys of 0, ★ and #).

Moreover, in FIG. 6 as well, for convenience of explanation, the first light-emitting portions F1 and the second light-emitting portions F2, the converters H, and the first light-receiving portions G1 and the second light-receiving portions G2 are partly shown schematically.

Although a configuration, operations and the like of the key device K as typified by those of the numeric keys 1 to 9 are hereinafter described with reference to FIGS. 5 and 6, the keys other than the numeric keys 1 to 9 have a similar configuration and operate similarly.

As shown for illustration in FIGS. 5 and 6, the key device K in the first embodiment is provided with the first light-emitting portions F1, the second light-emitting portions F2, the converters H, the first light-receiving portions G1, the second light-receiving portions G2, and the light-guiding portions 56. It should be noted that, in the following description, when an explanation common to the first light-emitting portions F1 and the second light-emitting portions F2 is made, the expression "the light-emitting portions" may be used. Moreover, when an explanation common to the first light-receiving portions G1 and the second light-receiving portions G2 is made, the expression "the light-receiving portions" may be used.

The first light-emitting portions F1 emit the light R propagating in a first direction D1, and m number thereof are provided (m is an integer of 1 or more).

The second light-emitting portions F2 emit the light R propagating in a second direction D2 other than the first direction D1, such that this light R is emitted so as to be intersected with the light R propagating in the first direction D1, and n number thereof are provided (n is an integer of 2 or more).

Examples of a light source of the first light-emitting portions F1 and the second light-emitting portions F2 include a laser oscillator, a light emitting diode (LED), an incandescent lamp, and a cold cathode tube.

It should be noted that the first light-emitting portions F1 and the second light-emitting portions F2 are not limited to light sources (emitting light by itself), but include those emitting light propagated by a light source as well.

The converters H are respectively provided to intersections of the light R propagating in the first direction D1 and the light R propagating in the second direction D2 in a case in which all the m number of the first light-emitting portions F1 and all the n number of the second light-emitting portions F2 emit the light at the same time. The converters H can convert the propagating direction of the light R from the first direction D1 to the second direction D2, or from the second direction D2 to the first direction D1. It should be noted that "convert the propagating direction of the light R" does not include a case in which the direction of the light path is partially changed by means of, for example, bending and the like of an optical fiber (to be described later) forming the light-guiding portion 56.

The first light-receiving portions G1 receive the light R propagating in the first direction D1 through the converters H, and at least m number thereof are provided.

The second light-receiving portions G2 receive the light R propagating in the second direction D2 through the converters H, and at least n number thereof are provided.

The first light-receiving portions G1 and the second light-receiving portions G2 are appropriately selected and used so as to respectively correspond to the light sources of the first light-emitting portions F1 and the second light-emitting portions F2.

The light-guiding portions 56 are portions that can guide the light R emitted from the first light-emitting portions F1 or the second light-emitting portions F2. The light-guiding portions 56 are disposed partly or entirely between the first light-emitting portions F1 and the converters H, between the second light-emitting portions F2 and the converters H, between the adjacent converters H and H, between the converters H and the first light-receiving portions G1, and between the converters H and the second light-receiving portions G2.

The first direction D1, the second direction D2, the first light-emitting portions F1, the second light-emitting portions F2, the converters H, the first light-receiving portions G1, and the second light-receiving portions G2 in the present embodiment are as follows.

The first direction D1 is a width direction of the operation unit side body 2 (substantially the left-right direction in FIG. 1). The second direction D2 is a longitudinal direction of the operation unit side body 2 (substantially the up-down direction in FIG. 1). Thus, in a planar view of the operation unit side body 2 in a thickness direction, the first direction D1 and the second direction D2 are orthogonal to each other. It should be noted that the first direction D1 and the second direction D2 are not necessarily orthogonal to each other, and for example, an angle formed by the first direction D1 and the second direction D2 may be 60 degrees.

As shown for illustration in FIG. 2, five of the first light-emitting portions F1 are provided so as to correspond to the number of lines (five lines) of the input operation keys 14. In FIGS. 5 and 6, only three of the first light-emitting portions F1, which correspond to the numeric keys 1, 4 and 7, are shown. For convenience, the three first light-emitting portions F1 are shown as F1 (1), F1 (2) and F1 (3) in order corresponding to the numeric keys 1, 4 and 7.

Three of the second light-emitting portions F2 are provided so as to correspond to the number of the columns (three columns) of the input operation keys 14. The second light-emitting portions F2 correspond to the numeric keys 1, 2 and 3. For convenience, the three first light-emitting portions F2 are shown as F2 (1), F2 (2) and F2 (3) in order corresponding to the numeric keys 1, 2 and 3.

The first light-receiving portions G1 are respectively provided to positions at which the light R emitted from first light-emitting portions F1 arrives in a case in which the propagating direction of the light R emitted from first light-emitting portions F1 is not converted by the converters H. Thus, five of the first light-receiving portions G1 are provided so as to correspond to the number of lines (five lines) of the input operation keys 14. In FIGS. 5 and 6, only three of the first light-receiving portions G1, which correspond to the numeric keys 3, 6 and 9, are shown. For convenience, the three first light-receiving portions G0 are shown as G1 (1), G1 (2) and G1 (3) in order corresponding to the numeric keys 3, 6 and 9.

The second light-receiving portions G2 are respectively provided to positions at which the light R emitted from second light-emitting portions F2 arrives in a case in which the propagating direction of the light R emitted from second light-emitting portions F2 is not converted by the converters H. Thus, three of the second light-receiving portions G2 are provided so as to correspond to the number of the columns (three columns) of the input operation keys 14. The second light-receiving portions G2 correspond to the numeric keys 7, 8 and 9. For convenience, the three second light-receiving portions G2 are shown as G2 (1), G2 (2) and G2 (3) in order corresponding to the numeric keys 7, 8 and 9.

As shown for illustration in FIG. 2, the converters H are respectively provided to intersections of the light R propagating in the first direction D1 and the light R propagating in the second direction D2 in a case in which all five of the first light-emitting portions F1 and all three of the second light-emitting portions F2 emit light at the same time. In other words, fifteen of the converters H are provided in total at positions corresponding to the input operation keys (numeric keys) 14, while being disposed in a matrix state (in lines) of five lines and three columns. In FIGS. 5 and 6, only nine of the converters H corresponding to the numeric keys 1 to 9 are shown.

The converter H converts the propagating direction of the light R by refracting or reflecting the light R. The converter H in the present embodiment is provided with a reflector 52, as described later, and converts the propagating direction of the light R by reflecting the light R with the reflector 52.

Next, the converter H is described in detail with reference to FIGS. 7A to 9C.

Figure 7A:
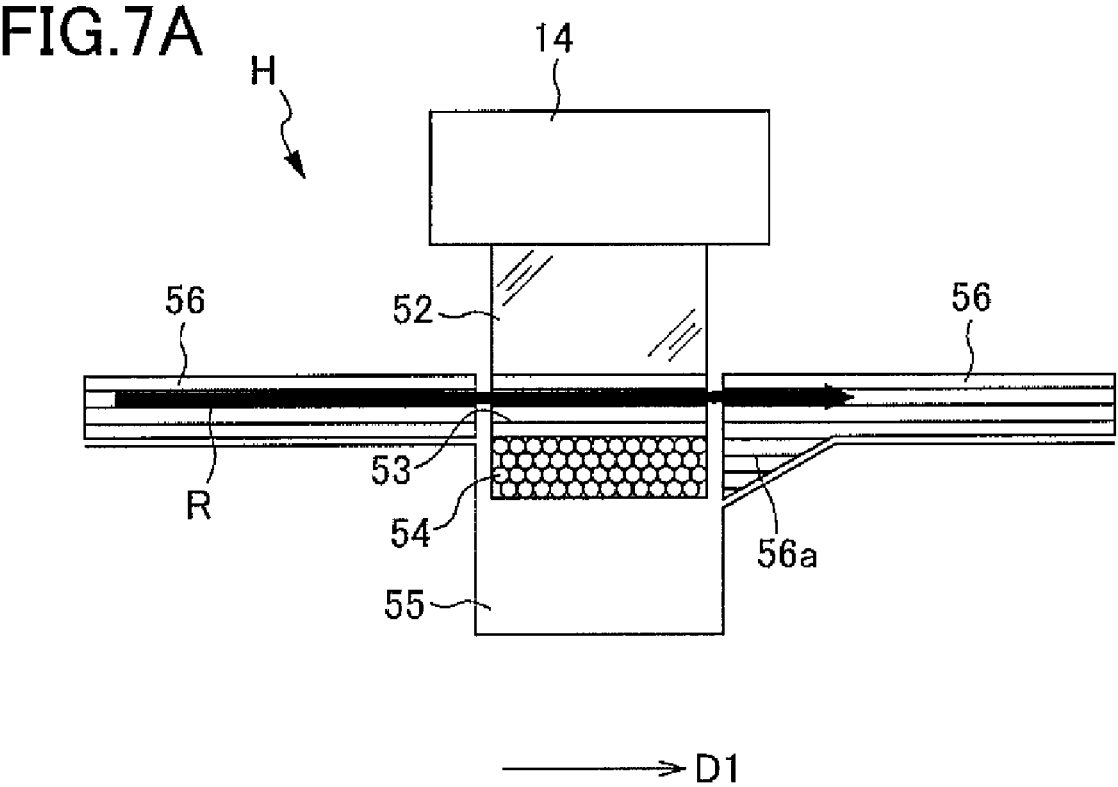
FIGS. 7A and 7B are schematic cross-sectional views of a converter H that is sectioned in a thickness direction of the operation unit side body 2.
Figure 7B:
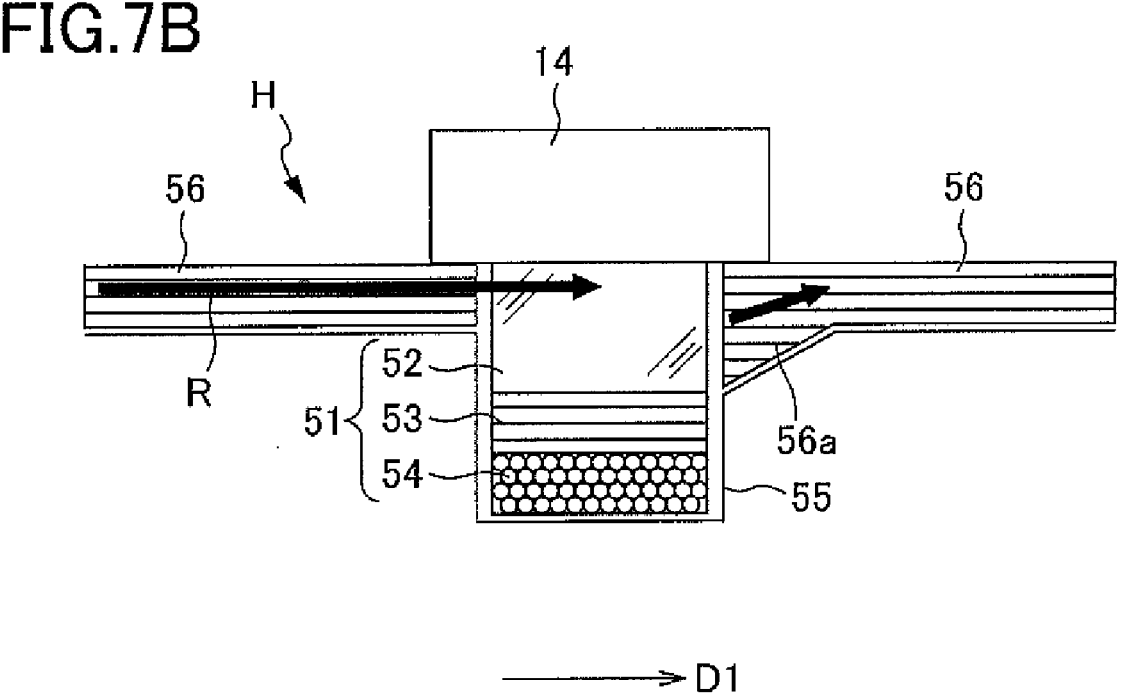

FIGS. 7A and 7B are schematic cross-sectional views of the converter H that is sectioned in the thickness direction of the operation unit side body 2. FIG. 7A is a cross-sectional view of the input operation key 14 in a non-depressed state that is sectioned along the first direction D1 (cross section along A-A in FIG. 6). FIG. 7B is a cross-sectional view of the input operation key 14 in a depressed state that is sectioned along the first direction D1 (cross section along B-B in FIG. 6).

Figure 8A:
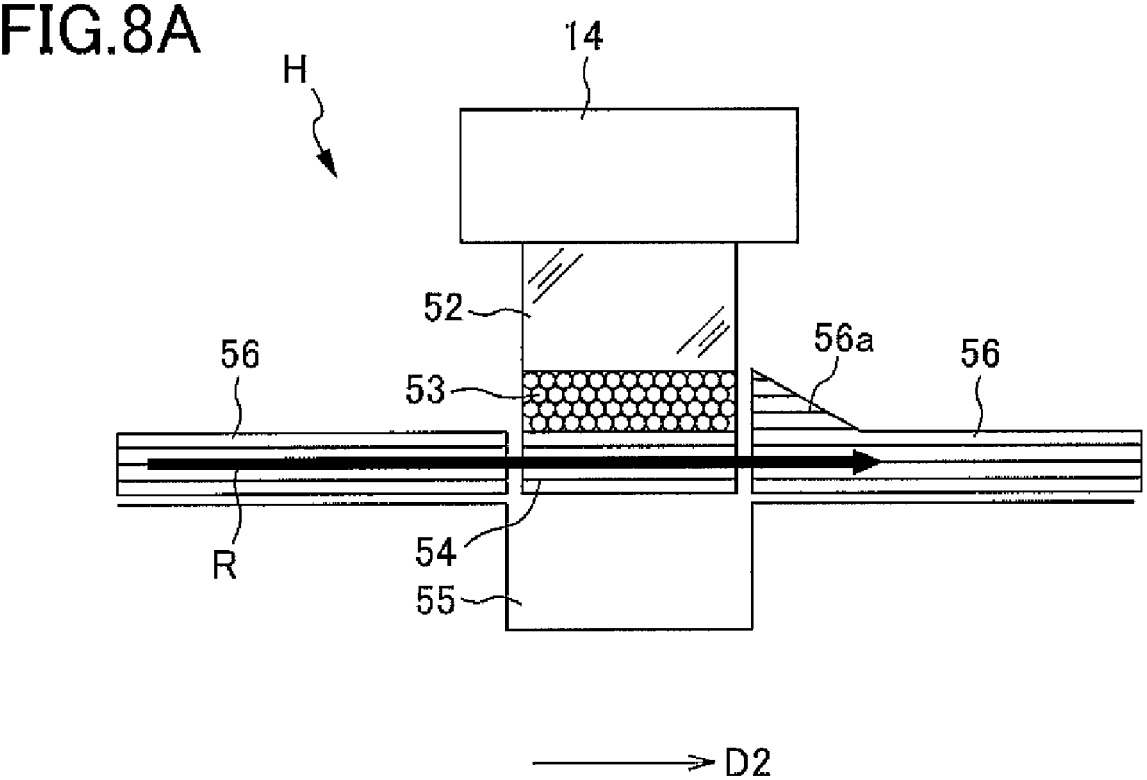
FIGS. 8A and 8B are schematic cross-sectional views of the converter H that is sectioned in the thickness direction of the operation unit side body 2.
Figure 8B:
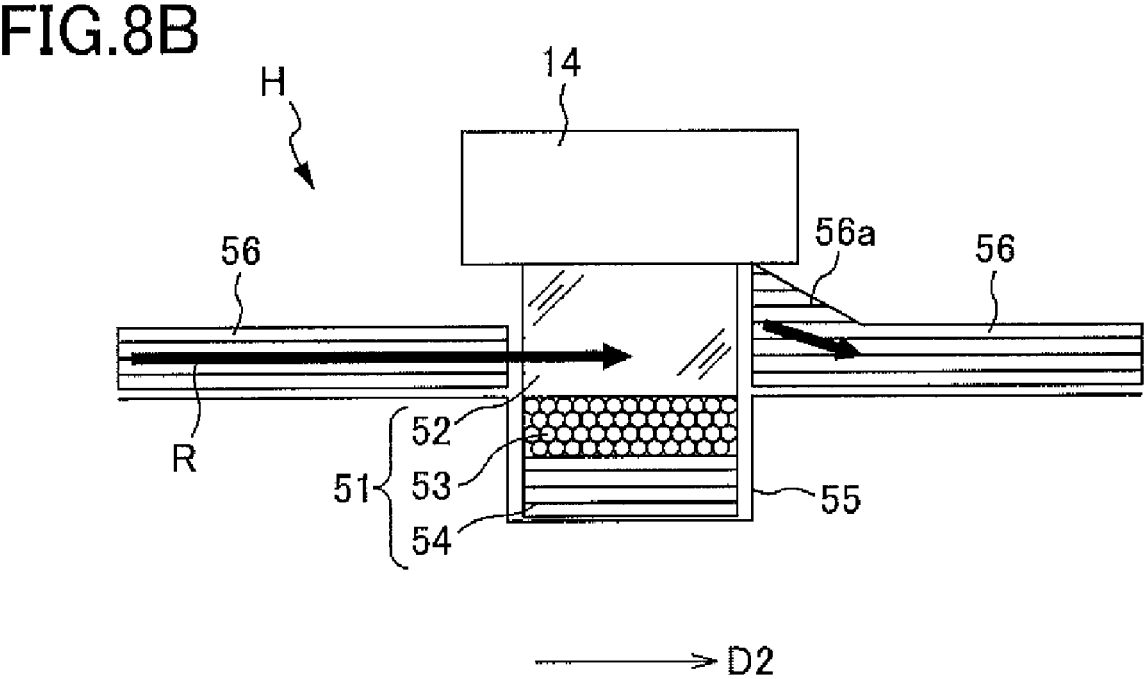

FIGS. 8A and 8B are schematic cross-sectional views of the converter H that is sectioned in the thickness direction of the operation unit side body 2. FIG. 8A is a cross-sectional view of the input operation key 14 in the non-depressed state that is sectioned along a second direction D2 (cross section along C-C in FIG. 6). FIG. 8B is a cross-sectional view of the input operation key 14 in the depressed state that is sectioned along the second direction D2 (cross section along D-D in FIG. 6).

Figure 9A:
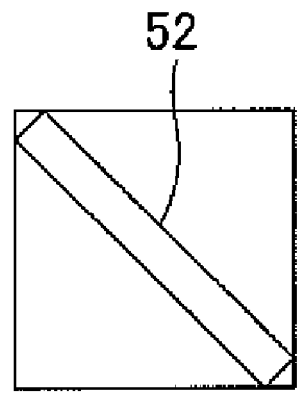
FIGS. 9A to 9C are schematic plan views of a connected member 51 of the converter H viewed in the thickness direction of the operation unit side body 2.
Figure 9B:
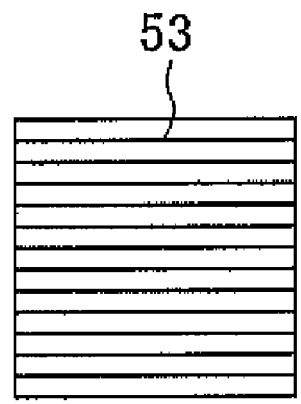
Figure 9C:
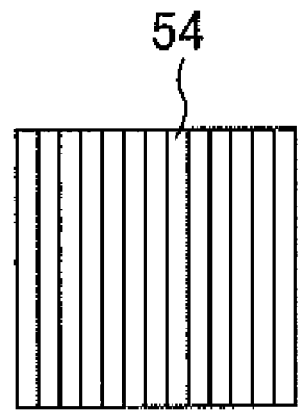

FIGS. 9A to 9C are schematic plan views of a connected member 51 of the converter H, which is viewed in the thickness direction of the operation unit side body 2. FIG. 9A is a view showing the reflector 52. FIG. 9B is a view showing a first transmission portion 53. FIG. 9C is a view showing a second transmission portion 54.

As shown for illustration in FIGS. 7A to 9C, the converter H is provided with the connected member 51 and an accommodating portion 55. The connected member 51 is connected to an inner face side (opposite to the push surface) of the input operation key 14. The connected member 51 is provided with the reflector 52, the first transmission portion 53, and the second transmission portion 54. The reflector 52 is a member that reflects the light R emitted from the first light-emitting portion F1 or the second light-emitting portion F2. The reflector 52 is connected to the inner face side of the input operation key 14 so as to form an angle of 45 degrees relative to each of the first direction D1 and the second direction D2.

Thus, when light R propagating in the first direction D1 is input, the propagating direction of the light R can be converted to the second direction D2 by use of the reflector 52 (refer to the light R emitted from the first light-emitting portion F1 (1) in FIG. 6). Moreover, when light R propagating in the second direction D2 is input, the propagating direction of the light R can be converted to the first direction D1 by use of the reflector 52 (see the light R emitted from the second light-emitting portion F2 (1) in FIG. 6).

The propagating direction of the light R reflected by the reflector 52 is a direction toward the first light-receiving portion G1 or the second light-receiving portion G2.

The reflector 52 is formed of, for example, a mirror or a resin reflector (porous PTFE or the like).

When the light R propagating in the first direction D1 is input, the first transmission portion 53 can output the light R to the first direction D1 without converting the propagating direction of the light R (see the light R emitted from the first light-emitting portion F1 (2) in FIG. 6). On the other hand, even if light propagating in a direction other than the first direction D1 (e.g., the second direction D2) is input, the first transmission portion 53 does not substantially transmit the light.

The first transmission portion 53 is made of, for example, an optical fiber using glass or plastic. The first transmission portion 53 is connected to a side of the reflector 52, the side being opposite to the input operation key 14.

When the light R propagating in the second direction D2 is input, the second transmission portion 54 can output the light R to the second direction D2 without converting the propagating direction of the light R (see the light R emitted from the second light-emitting portion F2 (2) in FIG. 6). On the other hand, even if light propagating in a direction other than the second direction D2 (e.g., the first direction D1) is input, the second transmission portion 54 does not substantially transmit the light.

The second transmission portion 54 is made of, for example, an optical fiber using glass or plastic, as in the case of the first transmission portion 53. The second transmission portion 54 is connected to a side opposite the input operation key 14 on the first transmission portion 53.

As described above, the connected member 51 is configured by connecting the reflector 52, the first transmission portion 53, and the second transmission portion 54, from the inner face side of the input operation key 14.

The accommodating portion 55 is a space for accommodating the connected member 51. When the connected member 51 is depressed together with depression of the input operation key 14, the accommodating portion 55 ensures an accommodation space for the connected member 51, thereby enabling the connected member 51 to be depressed (moved). The accommodating portion 55 is provided at a position corresponding to the connected member 51 of the converter H in the optical switch substrate 50.

As shown for illustration in FIGS. 7A and 8A, the reflector 52 is not accommodated in the accommodating portion 55 in a state in which the input operation key 14 is not depressed. On the other hand, as shown for illustration in FIGS. 7B and 8B, all or a portion of the reflector 52 is accommodated in the accommodating portion 55 in a state in which the input operation key 14 is depressed.

The plurality of converters H are provided to the plurality of input operation keys 14 correspondingly and respectively. In other words, the input operation keys 14 are provided to the plurality of converters H correspondingly and respectively. The input operation keys 14 determine whether to convert the propagating direction of the light R at the converters H.

As shown for illustration in FIGS. 7B and 8B, the propagating direction of the light R that is input to the converter H is converted at an angle of 90 degrees by the reflector 52 in a state in which the input operation key 14 is depressed. Thus, the converter H corresponding to the input operation key 14 converts the propagating direction of the light R that is input to the converter H (refer to the light R emitted from the first light-emitting portion F1 (1), and the light R emitted from the second light-emitting portion F2 (1) in FIG. 6).

On the other hand, as shown for illustration in FIGS. 7A and 8A, in a state in which the input operation key 14 is not depressed, the light R that is input to the converter H is transmitted through the first transmission portion 53 or the second transmission portion 54 without conversion of the propagating direction of the light R by the first transmission portion 53 or the second transmission portion 54. Thus, the converter H corresponding to the input operation key 14 does not convert the propagating direction of the light that is input to the converter H.

The light-guiding portions 56 are disposed entirely between the first light-emitting portions F1 and the converters H, between the second light-emitting portions F2 and the converters H, between the adjacent converters H and H, between the converters H and the first light-receiving portions G1, and between the converters H and the second light-receiving portions G2.

The light-guiding portions 56 are made of, for example, an optical fiber using glass or plastic.

Examples of the glass constituting the optical fiber using glass in the first transmission portion 53, the second transmission portion 54, the light-guiding portion 56 and the like include silica glass. Examples of the optical fiber using plastic include one in which a core material thereof is made of methacrylic resin (polymethyl methacrylate), and a clad material thereof is made of fluorinated polymer.

In the connected member 51, the first transmission portion 53 and the second transmission portion 54 are different in positions in the thickness direction of operation unit side body 2. Corresponding to this, the light-guiding portions 56 for guiding the light R in the first direction D1 and the light-guiding portions 56 for guiding the light R in the second direction D2 are different in positions in the thickness direction of the operation unit side body 2. The light-guiding portions 56 for guiding the light R in the first direction D1 are disposed closer to the input operation key 14 along the thickness direction of the operation unit side body 2 than the light-guiding portions 56 for guiding the light R in the second direction D2.

An input portion 56a in the light-guiding portion 56 is a portion to which the light is input, and faces the connected member 51. An area of the input portion 56a is larger than an area of an output portion (portion from which the light is output) in the light-guiding portion 56, in order to make it possible to input the light R that is output from the connected member 51 when the input portion 56a faces any of the reflector 52, the first transmission portion 53, and the second transmission portion 54. Moreover, the input portion 56a is tapered toward the propagating direction of the light R, and the light R, which is input to the input portion 56a, is condensed regardless of the input position, and is guided by the light-guiding portion 56.

Figure 10A:
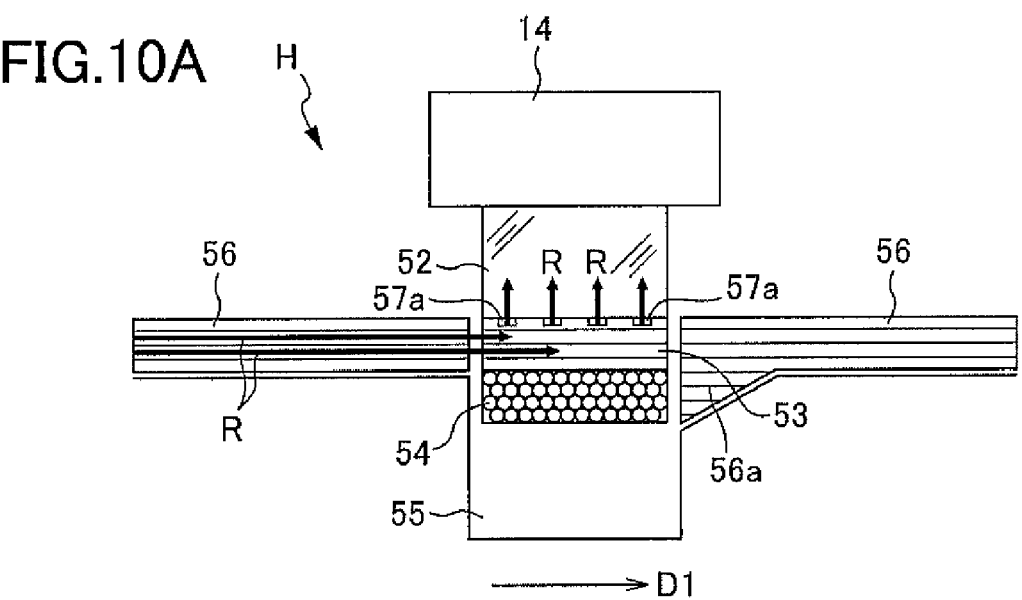
FIGS. 10A to 10C are schematic cross-sectional views showing configuration examples of light-releasing portions 57a to 57c, respectively.
Figure 10B:
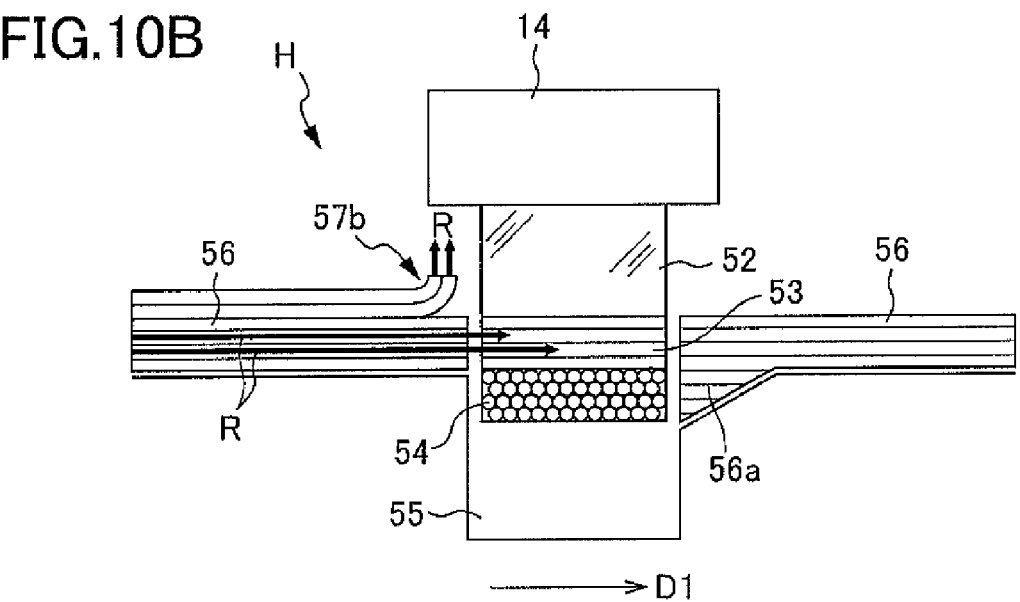
Figure 10C:
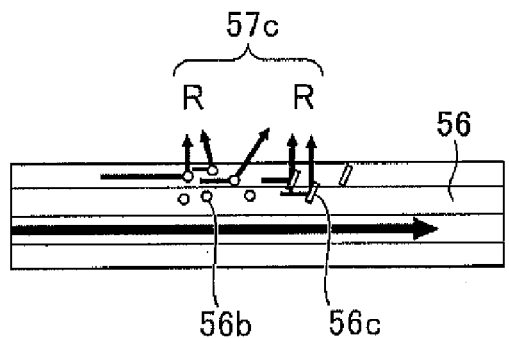

As shown for illustration in FIG. 6, the light-guiding portion 56 is provided with light-releasing portions 57. The light-releasing portions 57 are portions from which a part of the light R is released in a third direction other than the first direction D1 and the second direction D2. The positions of the light-releasing portions 57 are appropriately set depending on how the released light R is utilized. FIGS. 10A to 10C are schematic cross-sectional views showing configuration examples of light-releasing portions 57a to 57c, respectively.

In the example shown in FIG. 10A, the first transmission portion 53 positioned immediately under the input operation key 14 is configured with a plurality of optical fibers arranged in parallel. The light-releasing portions 57a are provided to part of the optical fibers positioned closer to the input operation key 14 than the other optical fibers among the plurality of optical fibers. In the part of the optical fibers as described above, the light-releasing portions 57 are formed by providing notches to a part of the clad material that covers the core material of the optical fibers. As a result, the part of the optical fibers has regions in which the core material is partly exposed, and part of the light R is released from the exposed regions.

In a case in which the regions in which the core material is partly exposed are positioned immediately under, or in the vicinities of, the input operation keys 14, part of the released light R functions as lighting for irradiating the input operation keys 14.

It should be noted that, in the aforementioned example, when the input operation key 14 is depressed, the light is not incident on the first transmission portion 53 to which the notches are provided, a result of which the depressed input operation key 14 does not light up. By utilizing this effect, the presence or absence of depression of each of the plurality of input operation keys 14 can be synchronized with the presence or absence of the lighting of the input operation keys 14. This makes it easy for the user to visually recognize the input operation key 14 that is currently depressed by the user, among the plurality of input operation keys 14.

Alternatively, as shown in FIGS. 10B, 5 and 6, in a case in which the plurality of optical fibers constituting the light-guiding portion 56 are arranged in parallel between the converter H corresponding to a key [1] (the number in [ ] denotes a number on the input operation key 14) of the input operation keys 14 and the converter H corresponding to a key [2] of the input operation keys 14, it is possible to employ the following configuration.

That is to say, a part of the optical fibers is separated from the other optical fibers among the plurality of optical fibers. More specifically, a part of the optical fibers is drawn from the middle of the light-guiding portion 56, and an end portion of the optical fibers thus drawn is disposed toward the key [2] of the input operation keys 14. Alternatively, the end portion is inserted inside of the key [2] of the input operation keys 14. The end portion of the part of the optical fibers thus drawn functions as the light-releasing portion 57b.

As a result, the light R that has been incident on the part of the optical fibers is separated from the light-guiding portion 56, and is released from the end portion (the light-releasing portion 57b). The released part of the light R functions as the lighting for irradiating the input operation key 14 from the inner side. In this case, it is possible to illuminate the input operation key 14 without synchronizing with the presence or absence of depression of the input operation key 14.

Alternatively, as shown in FIG. 10C, in a case in which the light-guiding portion 56 is made of stick-like acrylic resin, scattering materials 56b made of light-scattering particles or reflectors 56c made of metal or white resin may be partly built into the inside of the acrylic resin. As a result, the light R is reflected by the scattering materials 56b or the reflectors 56c in the inside of the light-guiding portion 56, thereby making it possible to form the light-releasing portions 57c for releasing the light to the outside of the light-guiding portion 56. It should be noted that, as the light-scattering particles, it is possible to employ, for example, particles made of resin, on which surface gold leaf is adhered.

The input operation key 14 is made of an optically-transparent member as described above, and is provided so as to cover the light-guiding portion 56. The input operation key 14 functions as an optically-transparent covering member that is provided so as to cover the light-guiding portion 56. Accordingly, the light released from the light-releasing portion 57 can be transmitted through the input operation key 14 that is the covering member. Thus, a part of the light R, which is emitted from the first light-emitting portion F1 or the second light-emitting portion F2, and which is guided to the light-guiding portion 56, is utilized as the lighting for the input operation key 14 and the like through the light-releasing portion 57.

In a case in which the covering member contains a scattering agent, the light is scattered, whereby the entire covering member is likely to emit light.

The first embodiment is configured such that the light R is simultaneously emitted from the plurality of first light-emitting portions F1 and the plurality of second light-emitting portions F2.

Moreover, in the first embodiment, the light R emitted from the plurality of first light-emitting portions F1 and the plurality of second light-emitting portions F2 has wavelengths that are different from one another. The reason is as follows.

As described above, the first embodiment is configured such that the light R is simultaneously emitted from the plurality of first light-emitting portions F1 and the plurality of second light-emitting portions F2. This makes it possible to detect depression of a key even in a case in which the depression time of the key is short.

The function setting operation keys 13 and the selection operation key 15 are also configured such that the presence or absence of depression of the keys 13 and 15 can be detected by the key device K, as in the case of the input operation keys 14.

FIG. 11 is a schematic diagram showing function setting operation keys 13 and a selection operation key 15, as well as the light-emitting portions F1 and F2 and the light-receiving portions G1 and G2, which are related to detection of depression of these keys 13 and 15 (the diagram corresponding to FIG. 5).

As shown for illustration in FIG. 11, the function setting operation keys 13 and the selection operation key 15 form parts of the matrix with three lines in the second direction D2 and five columns in the first direction D1. Four keys (function-1 key, function-2 key, call key, and end-call key) constituting the function setting operation keys 13 are disposed at the four corners of the matrix with three lines and five columns. As for the five keys (selection key, up key, down key, left key, and right key) constituting the selection operation key 15, the selection key is positioned in the center of the matrix with three lines and five columns, and the four other keys are respectively positioned in up, down, left and right positions adjacent to the selection key.

The function setting operation keys 13 and the selection operation key 15 are not disposed in other positions in the matrix with three lines and five columns. In other words, the matrix with three lines and five columns has positions on which no keys are disposed. However, as long as the keys can be disposed in the matrix state, it is possible to detect each key, even if the matrix has positions on which no keys are disposed.

Next, operations of the key device K in the cellular telephone device 1 of the first embodiment are described. According to the key device K, it is possible to detect the presence or absence of depression of keys as follows.

It should be noted that, although descriptions are made by using only the numeric keys 1 to 9 of the input operation keys 14 with reference to FIGS. 5 to 9C, it is also possible to detect the presence or absence of depression of keys for the other keys of the input operation keys 14 as well as the function setting operation keys 13 and the selection operation key 15.

Descriptions are made with reference to FIGS. 5 to 9C. For example, in a state in which all the numeric keys 14 are not depressed, the light R emitted from the first light-emitting portions F1 (1) propagates in the first direction D1 is transmitted through the first transmission portions 53 in the converters H corresponding to the key [1], the key [2] and the key [3] (the numbers in [ ] denote the numbers on the input operation keys 14), and is received by the first light-receiving portions G1 (1).

Moreover, in a state in which only the key [1] is depressed, the propagating direction of the light R emitted from the first light-emitting portion F1 (1) is converted at an angle of 90 degrees in the converter H corresponding to the key [1], and the light R propagates in the second direction D2. Subsequently, the light R is transmitted through the second transmission portions 54 in converters H corresponding to the key [4] and the key [7], and is received by the second light-receiving portion G2 (1).

Moreover, in a state in which the key [1] and the key [4] are depressed, the propagating direction of the light R emitted from the first light-emitting portion F1 (1) is converted at an angle of 90 degrees in the converter H corresponding to the key [1], and the light R propagates in the second direction D2. Next, the propagating direction of the light R is converted at an angle of 90 degrees in the converter H corresponding to the key [4], and the light R propagates in the first direction D1 again. Subsequently, the light R is transmitted through the first transmission portions 53 in the converters H respectively corresponding to the key [5] and the key [6], and is received by the second light-receiving portion G1 (2).

Although descriptions are omitted, in a case in which any one or more keys of the numeric keys are depressed, the light R emitted from the first light-emitting portion F1 (1) is received in this way by any of the first light-receiving portions G1 (1) to G1 (3) or the second light-receiving portions G2 (1) to G2 (3).

Moreover, the light R emitted from the light-emitting portions other than the first light-emitting portion F1 (1) (the first light-emitting portion F1 (2), the second light-emitting portion F2 (1) and the like) is received in this way by any of the first light-receiving portion G1 (1) to G1 (3) or the second light-receiving portion G2 (1) to G2 (3).

According to the cellular telephone device 1 of the first embodiment, for example, each of the following effects is achieved.

In the cellular telephone device 1 of the first embodiment, while one or more keys are depressed, each of the first light-receiving portions G1 and the second light-receiving portions G2 detects the presence or absence of light reception of the light R propagating through the converters H, and when there is light reception, the first light-emitting portion F1 or the second light-emitting portion F2, which has emitted the light R, is identified, thereby making it possible to detect the presence or absence of depression of the keys.

Accordingly, the antenna sheet P1 may be disposed in the vicinity of the key structure unit 40 (e.g., between the optical switch substrate 50 and the shielding case 60).

Moreover, since light is utilized for detecting the presence or absence of depression of the keys, the time for detecting depression of the keys is short.

Moreover, it is possible not only to detect the depression of only one key, but also to easily detect the depression of a plurality of keys (multiple depressions). Since multiple depressions can be reliably detected, it is possible to simplify and advance the input means represented by the keys. Moreover, it is also easy to detect a position of each of the plurality of keys depressed in multiple.

Moreover, in the cellular telephone device 1 of the first embodiment, the light-guiding portions 56 are disposed between the first light-emitting portions F1 and the converters H, and between the second light-emitting portions F2 and converters H and the like, a result of which the light emitted from the first light-emitting portions F1 or the second light-emitting portions F2 can be propagated to the first light-receiving portions G1 or the second light-receiving portions G2. Moreover, it is also possible to curve the light path by curving the light-guiding portion 56 depending on a material forming the light-guiding portion 56.

In addition, in the cellular telephone device 1 of the first embodiment, the light-guiding portions 56 are provided with the light-releasing portions 57, a result of which the light released from the light-releasing portions 57 may be used for lighting or illumination of the keys and the like.

Moreover, in the cellular telephone device 1 of the first embodiment, the light emitted from the plurality of first light-emitting portions F1 and the plurality of second light-emitting portions F2 may have wavelengths that are different from one another As a result, in a case in which the light-guiding portions 56 are provided with the light-releasing portions 57, it is possible to cause the light-releasing portions 57 to release light of different wavelengths, i.e. light of various colors, to be utilized as lighting and the like for the keys.

Next, a second embodiment of the present invention is described. Regarding the second embodiment, differences from the first embodiment are mainly described, the same reference numerals are assigned to configurations that are similar to those in the first embodiment, and descriptions thereof are omitted. The descriptions regarding the first embodiment are appropriately applied to points that are not particularly described regarding the second embodiment.

The cellular telephone device of the second embodiment is mainly different from the cellular telephone device 1 of the first embodiment in that the light emitted from the light-emitting portions has the same wavelength or wavelengths that are close to one another, and that the light is emitted at different timings. The other configurations are similar to those in the first embodiment.

Characteristic portions in the second embodiment are hereinafter described in detail.

In the second embodiment, the light emitted from the plurality of first light-emitting portions F1 and the plurality of second light-emitting portions F2 has the same wavelength or wavelengths that are close to one another, and the light is emitted at different timings. Here, in a case in which the first light-receiving portions G1 and the second light-receiving portions G2 receive a plurality of light beams substantially at the same time, the "wavelengths that are close to one another" refers to wavelengths with which the plurality of light beams can not be recognized as light that are different from one another, i.e. refers to light having wavelengths from which the light-emitting portion, which emitted the light that has been received, cannot be identified.

In the second embodiment, timings for emitting light are made different for the light having wavelengths from which the light-emitting portion, which emitted the light that has been received, cannot be identified. An interval of emitting light at different light-emitting portions may be a short time in which recognition cannot be made with dynamic visual acuity.

Moreover, the light-receiving portions detect the received light at timing coinciding with the light emission.

Moreover, according to the cellular telephone device 1 of the second embodiment, the light emitted from the plurality of first light-emitting portions F1 and the plurality of second light-emitting portions F2 is emitted at timings that are different from one another. Accordingly, the light source of the plurality of light-emitting portions may be made common.

Although embodiments of the present invention have been described above, the present invention is not limited to each of the aforementioned embodiments.

For example, although the first direction D1 and the second direction D2 are orthogonal to each other when viewed in the thickness direction of the operation unit side body 2 in each of the aforementioned embodiments, it is not limited thereto, and the two directions may be intersected at an angle other than a right angle.

Moreover, in a case of using light-guiding portions 56 that are not linear such as the light-guiding portions 56 made of optical fibers, the disposition of each key is not limited to a matrix state, and may also be slightly dislocated.

Although the converters H in each of the aforementioned embodiments convert the propagating directions of the light by reflecting the light, it is not limited thereto, and the propagating directions of the light can also be converted by refracting the light. The converters H for refracting the light can be implemented by utilizing, for example, prisms or optical fibers.

In each of the aforementioned embodiments, in addition to the first light-emitting portions F1 for emitting light propagating in the first direction D1, "the second light-emitting portions F2 for emitting light propagating in the second direction D2 so as to intersect with the light propagating in the first direction D1" are provided as light-emitting portions. However, in a case in which the keys, i.e., the converters H, are disposed only in the second direction D2, the second light-emitting portions F2 may not necessarily be provided.

Furthermore, in a case in which depression should be detected for one key, a configuration can be employed in which only one first light-emitting portion F1, only one converter H, only one first light-receiving portion G1, and only one second light-receiving portion G2 are provided. In addition, only one of either the first light-receiving portions G1 or the second light-receiving portions G2 may be provided, and detection of key depression can be made by means of the presence or absence of emitted light detection.

In the aforementioned embodiments, although the connecting portion 4 is provided with a so-called one-axis hinge mechanism in which the display unit side body 3 and operation unit side body 2 are connected so as to be openable and closable around the opening-and-closing axis, it is not limited thereto. The connecting portion 4 may be provided with a so-called biaxial hinge mechanism in which the display unit side body 3 and the operation unit side body 2 are connected so as to be openable and closable around an opening-and-closing axis, and are also connected so as to be pivotable around a pivot axis that is orthogonal to the opening-and-closing axis.

Moreover, instead of the foldable type in the aforementioned embodiments, the cellular telephone device according to the present invention may be a cellular telephone device of a slider type in which one of the bodies slides to one direction in a state in which the operation unit side body 2 and the display unit side body 3 are mutually superimposed. Moreover, the cellular telephone device according to the present invention may be a cellular telephone device of a rotating (revolver) type in which one of the bodies rotates around an axis line along the direction of superimposing the operation unit side body 2 and the display unit side body 3.

The present invention can be applied to a portable electronic device other than a cellular telephone device, and can also be applied to an electronic device other than the portable electronic device. Moreover, the present invention can be applied to a communication device other than a cellular telephone device.

Examples of a portable electronic device other than the cellular telephone device include PHS (registered trademark: Personal Handyphone System), a portable gaming machine, a portable navigation system, a PDA (Personal Digital Assistant), a notebook PC, and an EL display or a liquid crystal display provided with an operation unit.

Examples of an electronic device other than the portable electronic device include an electronic dictionary, a calculator, a personal organizer, a digital camera, a video camera, a radio and the like.

Examples of another communication device include a communication device provided with a one-segment tuner or a digital radio tuner.

What is claimed is:

1. A key device comprising:
   m number of first light-emitting portions that emit light propagating in a first direction (m is an integer of at least 1);
   n number of second light-emitting portions that emit light propagating in a second direction other than the first direction (n is an integer of at least 2);
   a plurality of converters, which are respectively provided at intersections of the light propagating in the first direction and the light propagating in the second direction and, in a case in which the m number of the first light-emitting portions and the n number of the second light-emitting portions emit the light at the same time, can convert the propagating direction of the light from the first direction to the second direction or from the second direction to the first direction;
   at least m number of first light-receiving portions that receive light propagating in the first direction through the converters;
   at least n number of second light-receiving portions that receive light propagating in the second direction through the converters; and
   a plurality of keys, which are provided correspondingly and to the plurality of converters, respectively, and which determine whether the propagating direction of the light in the converters is converted.

2. The key device according to claim 1, further comprising detecting portions that detect presence or absence of light reception of light propagating through the converters, at each of m number of the first light-receiving portions and n number of the second light-receiving portions, while one or a plurality of the keys are depressed.

3. The key device according to claim 1, wherein the converters convert the propagating direction of the light by refracting or reflecting the light.

4. The key device according to claim 1, wherein light-guiding portions that guide the light are disposed at least partly between the first light-emitting portions and the converters, between the second light-emitting portions and the converters, between the adjacent converters, between the converters and the first light-receiving portions, and/or between the converters and the second light-receiving portions.

5. The key device according to claim 4, wherein the light-guiding portions are made of an optical fiber.

6. The key device according to claim 1, wherein the light emitted from the plurality of first light-emitting portions and the plurality of second light-emitting portions have wavelengths that are different from one another.

7. The key device according to claim 1, wherein the light emitted from the plurality of first light-emitting portions and the plurality of second light-emitting portions has the same wavelength or wavelengths that are close to one another, and the light is emitted at different timings.

8. The key device according to claim 1,
   wherein the integer n is equivalent to the integer m.

9. An electronic device, comprising:
   the key device according to claim 1; and
   an electric circuit.

10. A key device comprising:
    m number of first light-emitting portions that emit light propagating in a first direction (m is an integer of at least 1);
    n number of second light-emitting portions that emit light propagating in a second direction other than the first direction (n is an integer of at least 2);

a plurality of converters, which are respectively provided at intersections of the light propagating in the first direction and the light propagating in the second direction and, in a case in which the m number of the first light-emitting portions and the n number of the second light-emitting portions emit the light at the same time, can convert the propagating direction of the light from the first direction to the second direction or from the second direction to the first direction;

at least m number of first light-receiving portions that receive light propagating in the first direction through the converters;

at least n number of second light-receiving portions that receive light propagating in the second direction through the converters; and a plurality of keys, which are provided correspondingly and to the plurality of converters, respectively, and which determine whether the propagating direction of the light in the converters is converted, wherein light-guiding portions that guide the light are disposed at least partly between the first light-emitting portions and the converters, between the second light-emitting portions and the converters, between the adjacent converters, between the converters and the first light-receiving portions, and/or between the converters and the second light-receiving portions, and the light-guiding portions comprise light-releasing portions that release part or all of the light in a third direction other than the first direction and the second direction.

11. The key device according to claim 10, further comprising optically-transparent covering members, which cover the light-guiding portions, and through which the light released from the light-releasing portions is transmitted.

12. A key device comprising:

m number of first light-emitting portions that emit light propagating in a first direction (m is an integer of at least 1);

n number of second light-emitting portions that emit light propagating in a second direction other than the first direction (n is an integer of at least 2);

a plurality of converters, which are respectively provided at intersections of the light propagating in the first direction and the light propagating in the second direction and, in a case in which the m number of the first light-emitting portions and the n number of the second light-emitting portions emit the light at the same time, can convert the propagating direction of the light from the first direction to the second direction or from the second direction to the first direction;

at least m number of first light-receiving portions that receive light propagating in the first direction through the converters;

at least n number of second light-receiving portions that receive light propagating in the second direction through the converters; and a plurality of keys, which are provided correspondingly and to the plurality of converters, respectively, and which determine whether the propagating direction of the light in the converters is converted, wherein the light emitted from the plurality of first light-emitting portions and the light emitted from the plurality of second light-emitting portions is emitted at different timings.

* * * * *